Jan. 12, 1932.   A. I. AKERVICK   1,840,762
FISHLINE STOP
Filed Jan. 12, 1931   3 Sheets-Sheet 1
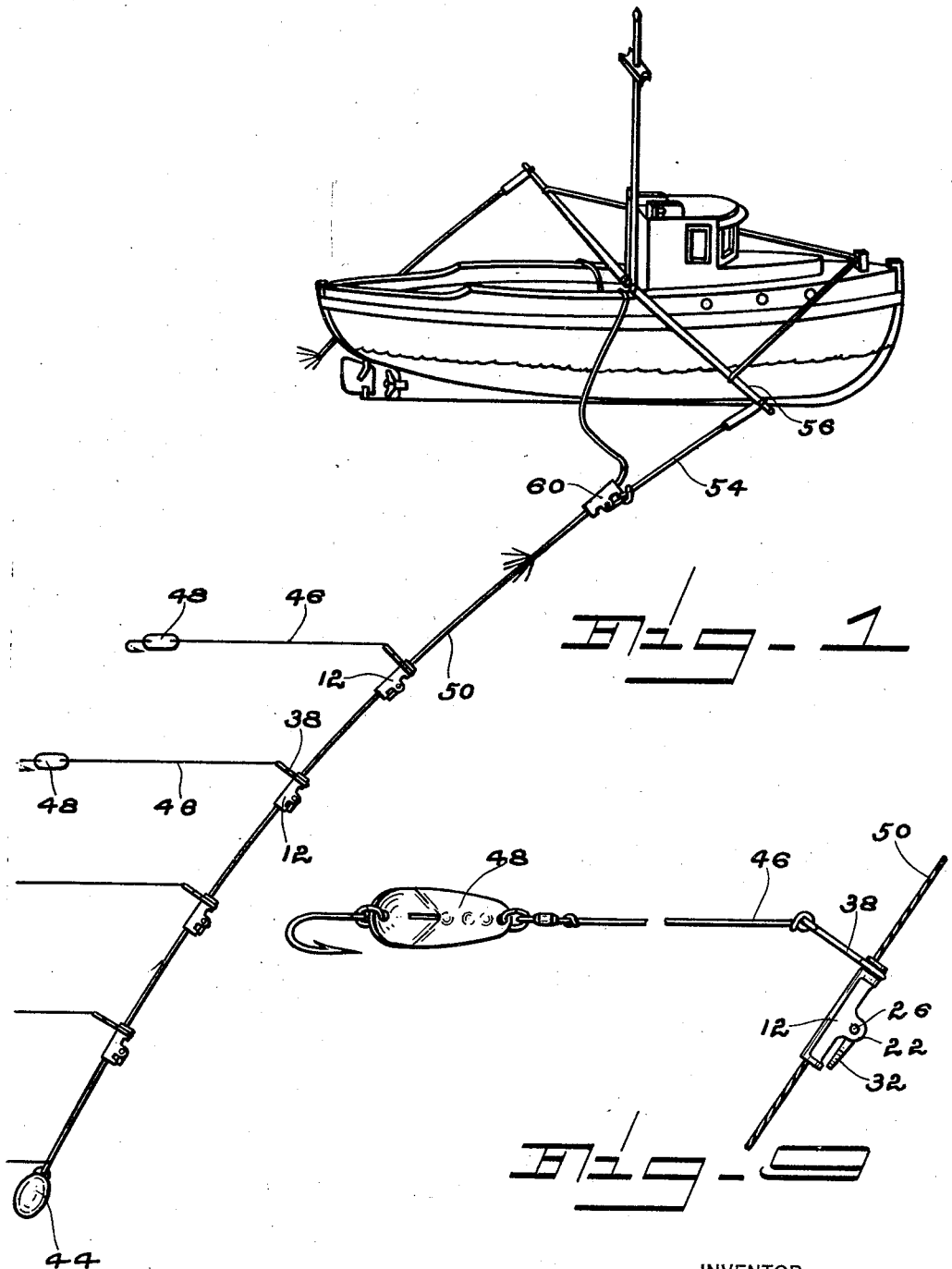
INVENTOR
Alfred I. Akervick
BY
Smith & Tuck
ATTORNEYS

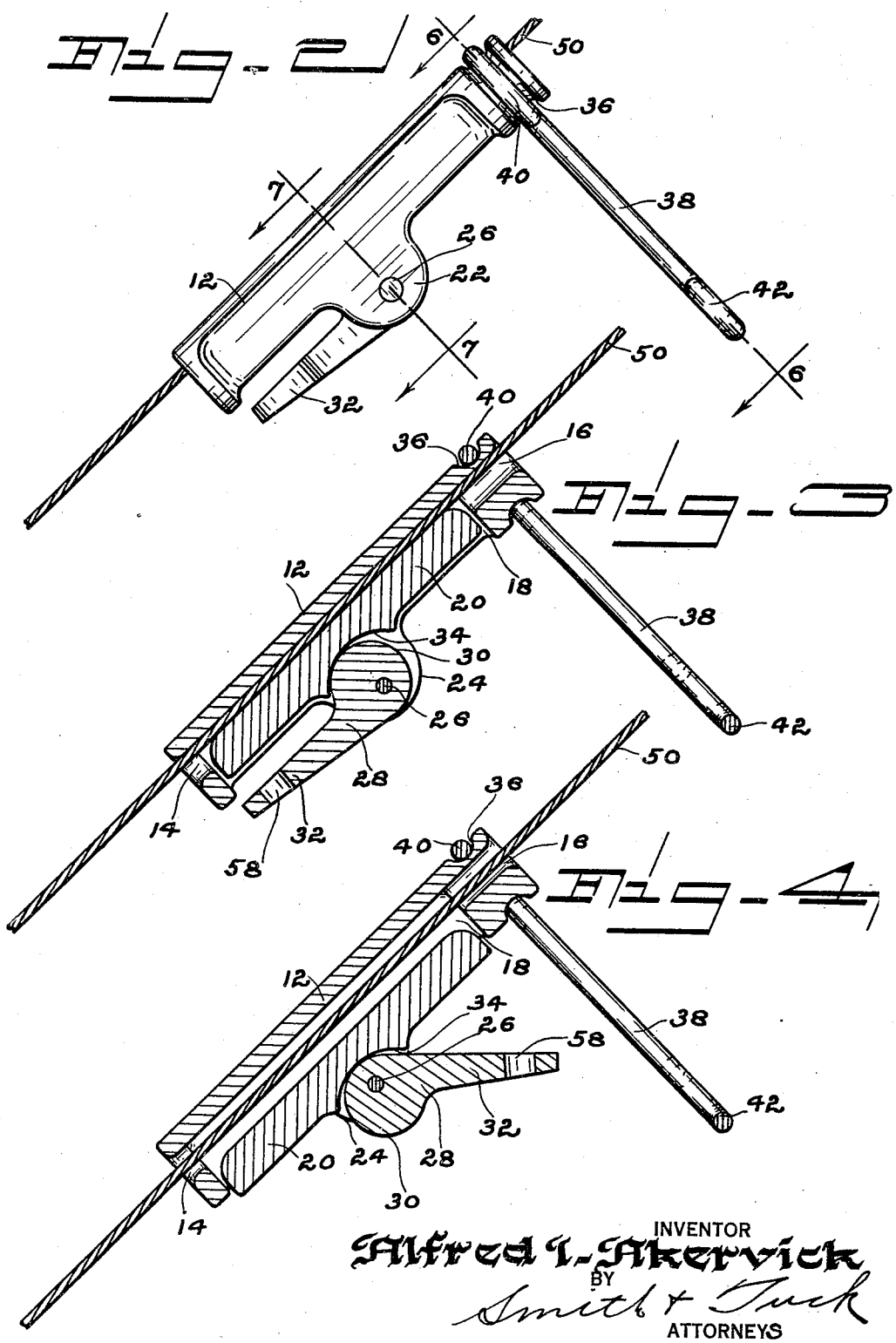

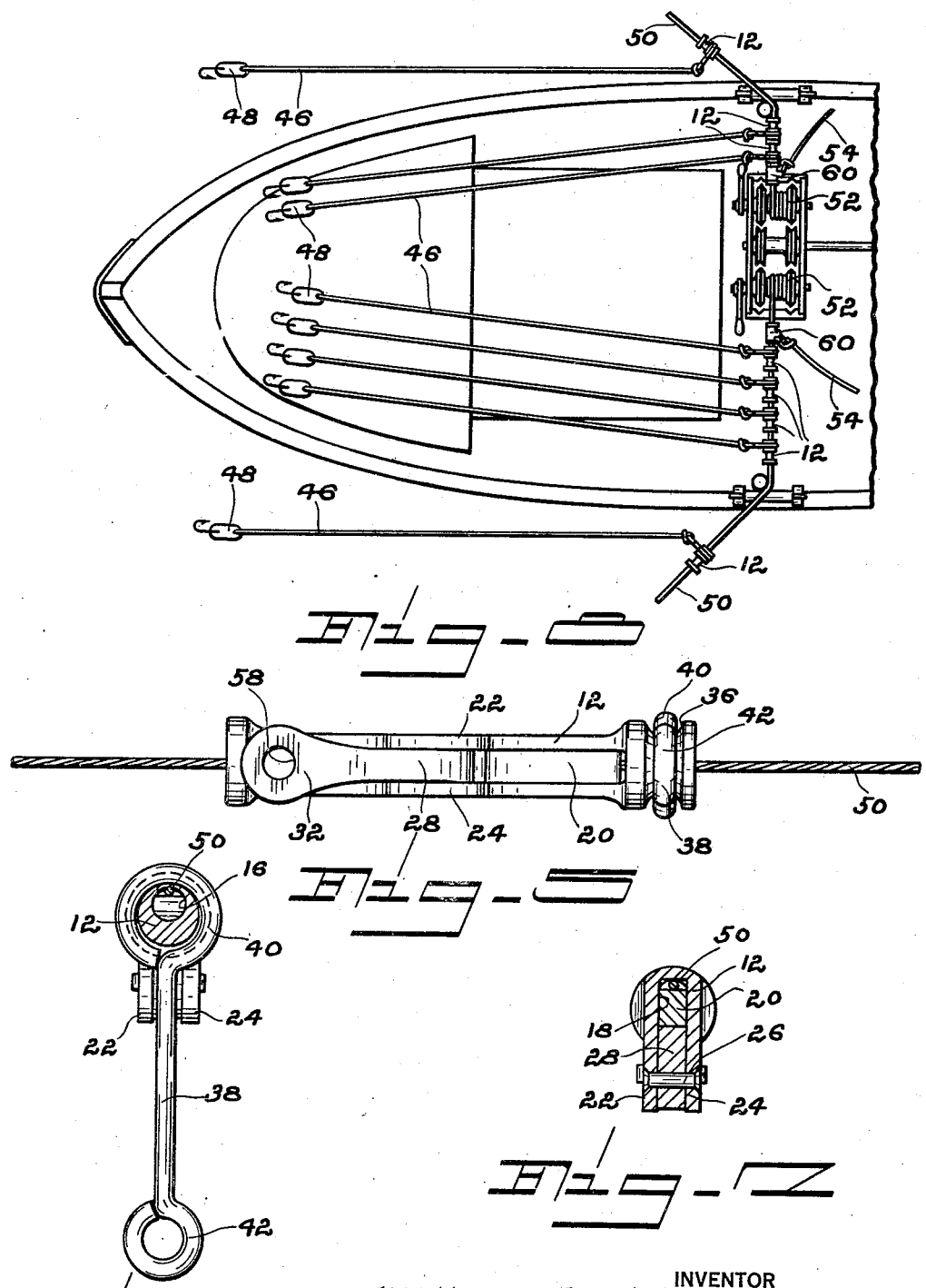

Patented Jan. 12, 1932

1,840,762

UNITED STATES PATENT OFFICE

ALFRED I. AKERVICK, OF SEATTLE, WASHINGTON

FISHLINE STOP

Application filed January 12, 1931. Serial No. 508,198.

My invention relates to the art of fishing devices and more particularly to a fish line stop, which is intended for use on boats whose business is commercial trolling for fish.

There has been a gradual development in trolling craft. A few years ago trolling was done largely in small boats propelled by oars. More recently, however, the commercial troller has been forced to seek fish in the less protected waters. This called for boats of larger and more expensive construction and as a result of the increased investment it has been necessary for the commercial fisherman to increase the amount of his catch. The most satisfactory way of doing this has been to increase the number of trolling lures which he offers to the fish.

It has been found, however, that in order to prevent tangling of lines, only a limited number of lines can be employed. This has usually been fixed at from four to six lines. Further, in order to make certain of catching fish which may be at greatly varying depths, it is customary to use several lures on the same main line, oftentimes as many as six or more lures being used on a single line. This in itself presents quite a problem when it is desired to reel in the lines or when a fish has been hooked and it is necessary to reel in the line. Formerly gurdies were used for this purpose which had an overhanging arrangement. This necessitated, however, coiling up the lines by hand as they were brought in and as the number of lines increased this plan became impractical and small winches have been substituted for the gurdies. These devices, however, differ from the gurdy in that the line is wound directly on the drum. Oftentimes it has been found desirable to substitute a wire main line for the fiber formerly used. It is under conditions like this that my invention is particularly desirable. Therefore, The principal object of my invention is to provide a line stop for fishing lines whereby other lines may be secured to the main line in an easily fixed or unfixed manner.

A further object is to provide a line stop which may be conveniently used with the drum type trolling winch wherein the various lures may be easily collected without fear of entangling.

Other and more specific objects will be apparent from the following description taken in connection with the accompanying drawings wherein Figure 1 is a diagrammatic perspective view showing the usual type of trolling boat and the manner in which my devices are used, certain parts, however, of necessity being enlarged out of proportion to the boat shown.

Figure 2 is a side elevation of my device in its clamped position.

Figure 3 is a longitudinal section through my device in its clamped position.

Figure 4 is a similar view showing my device in its released position.

Figure 5 is a bottom plan view showing my device in its locked position.

Figure 6 is a sectional view taken along the line 6—6 of Figure 2.

Figure 7 is a cross sectional view taken along the line 7—7 of Figure 2.

Figure 8 is a top plan view showing my device as used when reeling in a fishing line.

Figure 9 is an enlarged view showing the method of securing the trolling spoon to the main line by use of my device.

Referring to the drawings throughout which like reference characters indicate like parts, numeral 12 designates the main body of my device which I now prefer to form of rust resistant metal. This I have provided with line guide openings 14 and 16 through which the line is normally free to pass. Disposed between guides 14 and 16 I have provided a slot 18 adapted to receive the clamp bar 20. The two sides of slot 18 I prefer to have extending outwardly sufficient to form the two bosses 22 and 24 which in turn are adapted to receive the pivot pin 26. Pivotally mounted on pin 26 is an eccentrically formed locking cam 28 having the cam portion 30 which is adapted to engage and operate the lock bar 20 and which is provided with an operating handle 32. The exact manner of connecting cams 30 and lock bars 20 is relatively immaterial. The arrangement shown in Figures 3 and 4 has proven very satisfactory. In this I have provided a curved seat 34 in the outer face of lock bar 20 and once the cam is seated therein the lock bar itself cannot be displaced and lost.

Line guide 16 is formed of sufficient length so that an annular groove 36 may be cut on the outerside thereof and provide a seat for the coupling link 38. Link 38 is most clearly disclosed in Figure 6 and consists of the eye member 40 which is made sufficiently larger than the bottom of groove 36 that it will be free to turn therein, but still cannot be lost out of the groove. I then provide a straight shank of a length just sufficient so that swiveling in groove 36 will be assured and provide at the opposite end a smaller ring as 42 to which the spoon line or leader is attached.

Method of use

In using my device the troller will pay out his line at the extreme end of which is attached a weight 44. This weight is usually made of lead and may range up to 50 or 60 lbs. Usually, however, somewhat less than this is used. At intervals, such as experience alone can dictate, my devices are clamped along the line until several of them are clamped at spaced intervals in a manner as indicated in Figure 1. To loops 42 are attached light lines or leaders 46 which in turn are secured to the fishing lure or spoons 48.

Now it is essential that the main line 50 pass directly to the trolling winch and to accomplish this a short tag line 54 is secured to an outwardly extending boom 56. Line 54 is passed through an opening 58 in handle 32 and the body 12 is reversed in its position from that of the spoon locking members. In this position the drag of line 50 against line 54 is sufficient to securely lock my modified member 60 on the main line 50. In this particular installation it should be understood that link 38 serves no purpose and can be removed. When, however, it is desired to reel in the main line, winch 52 is started and the line is drawn in. As soon as member 60 is taken inboard lever 32 is thrown to the released position as shown in Figure 4 and the line 50 is then free to pass therethrough until the next lock member 12 comes inboard. At this point the cam lever is thrown to the released position and the spoon with its leader laid to one side as indicated in Figure 8. This operation is continued until all the spoons have been taken in and then finally the lead. After the stop member has been released it offers no resistance to the passage of the line either in or out and in this manner it has been found possible to handle conveniently, quickly and without fear of entangling, a large number of lines.

Often it is desirable to use a float on each of the outermost lines of a boat to the end of keeping the various lines further apart when they are in the water, and I have found that one of my devices if applied as in the case of device numbered 60, can be used very satisfactorily to connect the line and the float.

The foregoing description and the accompanying drawings are believed to clearly disclose a preferred embodiment of my invention but it will be understood that this disclosure is merely illustrative and that such changes in the invention may be made as are fairly within the scope and spirit of the following claims.

What I claim is:—

1. A fish line stop consisting of a body member; a line guide at each end of said body member; a clamp bar disposed between said line guides; a locking member pivotally secured to said body member and disposed to secure the clamp bar in the locked position.

2. A fish line stop consisting of a body member having a line guide at each end thereof; a clamp bar; a longitudinally disposed recess between said line guides, providing a line passageway, and disposed to receive said clamp bar; a locking cam pivotally secured to said body member, disposed to secure said clamp bar in position and urge it into said line passageway.

3. A fish line stop consisting of a body member; line guides disposed at each end of said body member; a recess disposed between said line guides, providing a line passageway, having outwardly extending sides; a lock bar disposed between said extending sides; a locking cam pivotally secured to said extending sides, disposed to press said bar into the line passageway and finally to secure the bar in its locked position.

4. A fish line stop consisting of a body member; line guides disposed at each end of said body member; a recess disposed between said line guides, providing a line passageway, having outwardly extending sides; a lock bar disposed between said extending sides; a locking cam pivotally secured to said extending sides, disposed to press said bar into the line passageway and finally to secure the bar in its locked position; an annular groove disposed about the uppermost line guide and a link revolvably secured in said groove.

5. A fish line stop consisting of a body member; line guides disposed at each end of said body member; a recess disposed between said line guides, providing a line passageway, having outwardly extending sides; a lock bar disposed between said extending sides; a locking cam pivotally secured to said extending sides, disposed to press said bar into the line passageway and finally to secure the bar in its locked position; an operating handle for said cam having a line receiving opening in the outermost end thereof; an annular groove disposed about the uppermost line guide and a link revolvably secured in said groove.

In witness whereof, I hereunto subscribe my name this 3rd day of January, A. D. 1931.

ALFRED I. AKERVICK.